N. B. Wallace's Watch Case

2887

Reissued

Mar 3 1868

Witnesses
Theo. Tusche
Wm. Irwin

Inventor
N. B. Wallace
Per Munn & Co
Attorneys

UNITED STATES PATENT OFFICE.

N. B. WALLACE, OF FOND DU LAC, WISCONSIN.

IMPROVEMENT IN WATCHES.

.cification forming part of Letters Patent No. 68,814, dated September 10, 1867; Reissue No. 2,887, dated March 3, 1868.

*To all whom it may concern:*

Be it known that I, N. B. WALLACE, of Fond du Lac, in the county of Fond du Lac and State of Wisconsin, have invented a new and useful Improvement in Watch-Cases; and I do hereby declare that the following is a full, clear, and exact description thereof, which will enable those skilled in the art to make and use the same, reference being had to the accompanying drawings, forming part of this specification.

In the cases used for "American watches," so called, great trouble is experienced in keeping the movement clean and in proper working order, owing to the admission of dirt to the movement through the holes provided for the lifting and catch springs of the watch-case; and to obviate the above is the object of the present invention, it being accomplished thereby as and in a manner to be now described, reference being had to the accompanying plate of drawings, in which—

Figure 1:
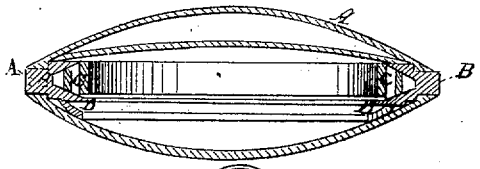
Figure 2:
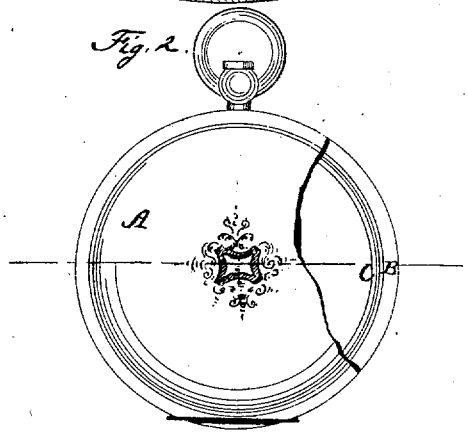
Figure 3:
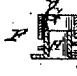
Figure 4:
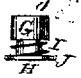

Figure 1 is a central section through a watch-case with my improvement applied thereto; and Fig. 2, a view of the front side to the case, partially broken out upon one side; Figs. 3 and 4, views, the one a central section, and the other a side view, of a cup for inclosing the winding posts or axes to the watch-movement, and packing the same about the winding and center hole in the cap-plate to the case.

Similar letters of reference indicate like parts.

A in the drawings represents a watch-case of that class of cases used more particularly for holding the movement to an "American watch," so called; B, the rim of the case, in and by which the movement is inclosed and held; C, a ring of metal inserted within the rim B, around the inside of which it fits, resting upon the shoulder or flange D upon the back side to the rim. This ring C serves to close up the openings or holes in the rim for the lifting and catch springs, and thus prevents the passage of dirt through them to the movement. The shoulder or flange D may be grooved to receive the edge of the ring in contact therewith, if so desired. F is my improved cup or tube for the winding and center post or axis. This cup is made in two parts or sections, H and G, the one arranged to play within the other, with a spiral spring encircling the section H between the end of section G and the flange or rim J of the section H. This cup F, by the flange upon the end of section H, is fastened to the back plate of the watch-movement, over and about the center or winding post thereof, in which position, by the closing of the cap-plate upon the back of the watch, the section G, by means of spring I, is pressed against the said cap-plate, and the section G being thus held closes against the cap-plate and forms a barrier to the passage of dust through the said hole for the winding or center post to the moving parts of the watch.

Having thus described my invention, I claim as new and desire to secure by Letters Patent—

The two-part cup F, for the winding-post or other axis of a watch-movement, substantially as and for the purpose described.

The above specification of my invention signed by me this 8th day of October, 1867.

N. B. WALLACE.

Witnesses:

WM. F. MCNAMARA,

ALBERT W. BROWN.